United States Patent [19]
Lane

[11] 3,880,723
[45] Apr. 29, 1975

[54] METHOD OF MAKING SUBSTRATES FOR MICROWAVE MICROSTRIP CIRCUITS

[75] Inventor: Clyde H. Lane, Rome, N.Y.

[73] Assignee: The United States of America as represented by the Secretary of the Air Force, Washington, D.C.

[22] Filed: Aug. 28, 1973

[21] Appl. No.: 392,378

[52] U.S. Cl. .................... 204/12; 204/15; 204/38 R
[51] Int. Cl. ....... C23b 5/48; C23b 7/02; C23f 17/00
[58] Field of Search ............ 204/12, 15, 38 C, 38 E, 204/281, 38 R

[56] References Cited

UNITED STATES PATENTS

| | | | |
|---|---|---|---|
| 2,874,085 | 2/1959 | Brietzke | 204/12 |
| 2,984,595 | 5/1961 | Schumpelt et al. | 204/281 |
| 3,181,986 | 5/1965 | Pritikin | 156/233 |
| 3,324,014 | 6/1967 | Modjeska | 204/15 |
| 3,414,487 | 12/1968 | Helms et al. | 204/13 |

*Primary Examiner*—T. M. Tufariello
*Attorney, Agent, or Firm*—Henry S. Miller

[57] ABSTRACT

Utilizing photo resist techniques a microstrip circuit is applied to a soluble or etchable substrate having a thin film conductor on at least one surface, after formation of the circuit the photo resist is removed, and the circuit arc-plasma sprayed, subsequently, the original substrate is removed. Another embodiment causes the area from which the original substrate has been removed to be arc-plasma sprayed thereby causing the circuit to be encapsulated. Another embodiment plates the outside surface of the encapsulated circuit to achieve a TEM mode of propagation.

3 Claims, 9 Drawing Figures

METHOD OF MAKING SUBSTRATES FOR MICROWAVE MICROSTRIP CIRCUITS

BACKGROUND OF THE INVENTION

This invention relates generally to the fabrication of miniature microwave systems and more particularly to a method of making an encapsulated microstrip line or microwave circuit.

Due to the performance required from currently available microwave circuits, the industry has had to rely upon hybrid circuits. The planar fabricating techniques presently known have been unable to meet these stringent requirements and as a result there has developed a need for a method of fabricating a completely miniaturized microwave circuit.

One recent advance in the art is the utilization of an arc-plasma spray process whereby a metal or other material may be placed with great accuracy on top of a dielectric substrate. The process lends itself to masking, a technique well known in the art, and as a result circuit geometry may be provided on a substrate with relative ease. Also such a process is capable of building a device of different material layers with a high degree of reliability. The method is characterized by its ability to function with a variety of materials and produce a high quality produce.

The arc-plasma spray process has been limited in the past however, to its ability to provide high-quality thin film deposition. No known attempt has been made to utilize the advantages of this process for fabricating encapsulated microwave apparatus whereby devices for TEM propagation made may be obtained or alternatively, the advantages of conformal heat sink qualities in an active miniature microwave device.

SUMMARY OF THE INVENTION

The invention involves an improved utilization of the arc-plasma spray process for the fabrication of miniature microwave systems and like devices. In one aspect of the invention, the process consists of placing a miniature circuit upon a specially constructed substrate and arc-plasma spraying the circuit. The constructed substrate is subsequently removed, leaving the miniature circuit embedded in an arc-plasma sprayed substrate. The novelty in the process involves the removal of the constructed substrate without damaging the miniature circuit.

In another aspect of the invention, the additional step of arc-plasma spraying the embedded circuit to provide a totally encapsulated circuit is taught. Prior to the application of the dielectric, active or passive devices may be attached to the circuit and included in the encapsulation.

A further aspect of the invention would include plating one or more sides of an encapsulated circuit. The material chosen would allow for various functions such as a ground plane for allowing a TEM propagation mode for microwaves or alternatively a complete conformal heat sinking of active devices.

It is therefore an object of the invention to provide a new and improved process for providing substrates for microwave microstrip circuits.

It is another object of the invention to provide a new and improved process for fabricating substrates for microwave microstrip circuits that will provide greater flexibility in substrate properties and geometry than hitherto known.

It is a further object of the invention to provide a new and improved microstrip fabrication process that will provide a planar substrate combined with the embedding of microstrip lines therein.

It is still another object of the invention to provide a new and improved microstrip fabrication process that will allow for the heat sinking of active devices.

It is another object of the invention to provide a new and improved fabrication process that provides for the complete ceramic encapsultation of microwave circuits employing TEM mode.

It is another object of the invention to provide a new and improved fabrication process for electronic devices that allows for greater selection and control of material properties of substrates.

It is another object of the invention to provide a new and improved process for constructing high quality microwave microstrip circuits without a circuit size restriction.

These and other advantages, features and objects of the invention will become more apparent from the following description taken in connection with the illustrative embodiments in the accompanying drawings.

DESCRIPTION OF THE PREFERRED EMBODIMENTS

Figure 1:
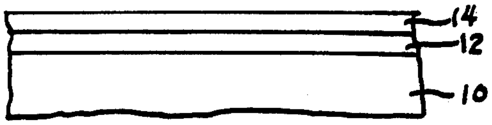
FIGS. 1 through 9 show a crossectional view of a microstrip circuit during various steps of the invention.
Figure 2:
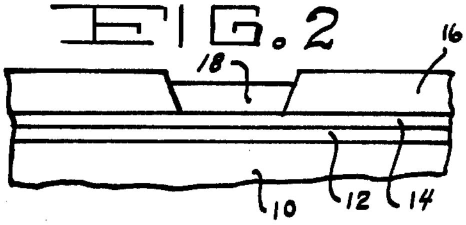

Referring now to FIGS. 1 to 5, the process for embedding circuits in a dielectric involves depositing two to ten thousand angstroms of a readily soluable or etchable substrate. Followed with a conductive layer 2 to 10,000 angstroms thick which is adherent to the first film. An example of the process would consist of depositing an aluminum film 12 on an aluminum foil substrate 10 by evaporation in a vacuum. Without breaking the vacuum then, deposit a film of gold 14 over the aluminum.

Upon this base, a photo resist 18, such as Waycoat, KMER or Shipley 1350H, is applied providing a pattern for electroforming circuit conductors (18) 0.0003 inches in thickness. Although gold would prove to be the best selected material, copper or silver could be utilized as an adequate substitute.

Figure 3:
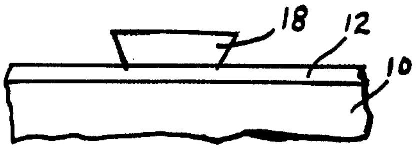
Figure 4:
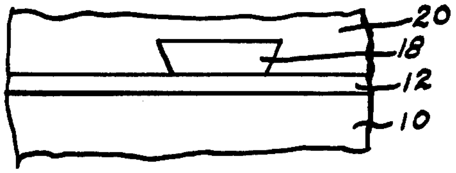
Figure 5:
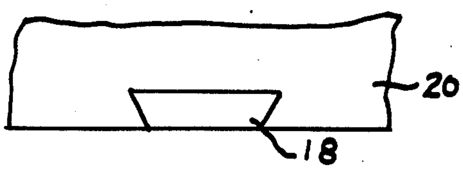

Subsequent to the electroforming of the circuit conductors, the photoresist material 16 is etched away, as shown in FIG. 3, along with the thin film 14 leaving the circuit conductor 18 resting on the aluminum film 12. The combination of materials shown in FIG. 3 is then arc plasma sprayed with a suitable dielectric substrate 20; approximately 0.010 to 0.020 inches thick as shown in FIG. 4.

In the final step the original substrate 10 and the first deposited film is removed by dissolving or etching, thereby leaving the circuit conductor 18 embedded in the dielectric 20. Subsequently, appropriate connectors may be applied to the conductor for utilization of the circuit in a microwave device.

Figure 6:
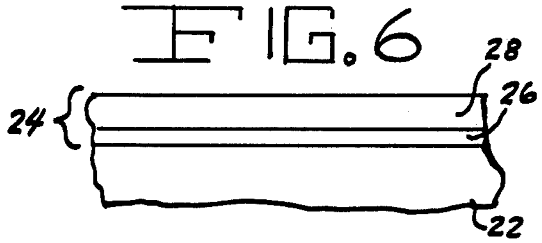
Figure 7:
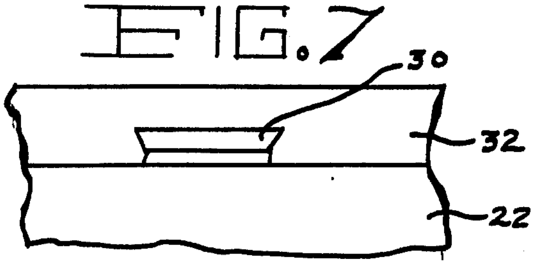

A supplementary process for fabricating circuits is illustrated in FIGS. 6 and 7. A dielectric substrate 22, for example alumina ($Al_2O_3$), has deposited thereon a conductive layer 24. The conductive layer could consist of 200 angstroms of chromium (26) and 2 to 10,000 angstroms of gold. The conductive layer would be formed by evaporation without breaking vacuum.

The method would continue with the placement of a photo resist, electroforming of a circuit strueture through the resist and the subsequent removal of the resist and thin film conductors as described hereinbefore with regard to the aforementioned basic process.

The resultant product is arc plasma sprayed and the original substrate 22 is removed leaving, the circuit 30 embedded in the dielectric substrate 32 as shown in FIG. 7.

Figure 8:
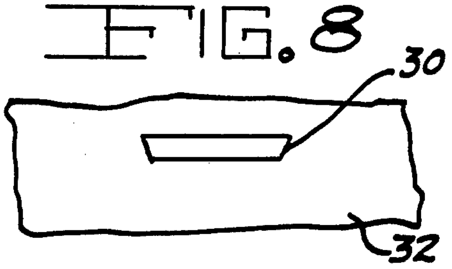

Following these steps active and passive miniature devices may be attached to the circuit thereby making it more adaptable for a specific microwave function. The substrate, circuit and attached devices are then subjected to the arc plasma spray process. The circuit 30 and attached devices are then buried in the dielectric 32 shown in FIG. 8.

Appropriate arrangements must be made to allow for connections to the circuit, however, these would be considered conventional to one skilled in the art.

Figure 9:
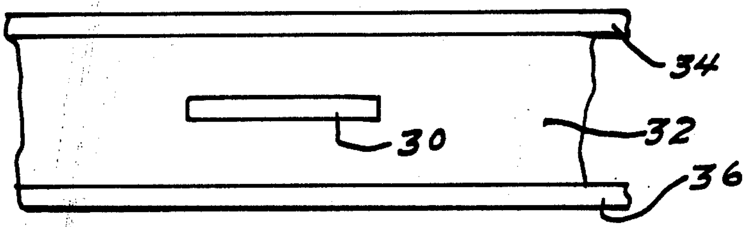

A further advance in the art results from an additional step being added to the supplementary process. Concerning FIG. 9, the buried conductor 30, is held in the dielectric substrate 32 as described. If conductive material 34, 36 is applied to opposite sides of the dielectric, it is now possible to achieve a TEM mode of propagation in the circuit. The advantages of such a device are obvious to those in the art.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In a method of fabricating microwave, microstrip circuits, the steps of: depositing a first layer of soluable material on a smooth soluable substrate material; depositing a second layer of soluable conductive material on said first layer; applying a patterned photo resist to the second layer; electroplating a conductive material through said resist; removing the resist; arc-plasma spraying the resulting circuit and exposed second layer with a dielectric material and removing the original substrate and first and second layers.

2. A method of fabricating microwave, microstrip circuits according to claim 1 including the additional step of arc-plasma spraying the circuit and exposed dielectric surface with a dielectric material.

3. A method of fabricating microwave, microstrip circuits according to claim 2 including the additional step of electroplating a layer of conductive material on opposed exterior surfaces of the microcircuit.

* * * * *